US010742772B2

(12) United States Patent
Song et al.

(10) Patent No.: US 10,742,772 B2
(45) Date of Patent: Aug. 11, 2020

(54) METHOD FOR TRANSFORMING DATA FOR LOW VOLUME TRANSMISSION OF META MODEL BASED PROTOCOL WHICH MONITORS POWER AMOUNT DATA OF NEW RENEWABLE ENERGY, AND SYSTEM FOR TRANSMITTING DATA FOR LOW VOLUME TRANSMISSION OF META MODEL BASED PROTOCOL WHICH MONITORS POWER AMOUNT DATA OF NEW RENEWABLE ENERGY

(71) Applicant: SEJONG INDUSTRY-ACADEMIA COOPERATION FOUNDATION HONGIK UNIVERSITY, Jochiwon-eup, Sejong-si (KR)

(72) Inventors: Hyun Seung Song, Dangjin-shi (KR); So Young Moon, Sejong-si (KR); Eun Young Byun, Sejong-si (KR); Woo Sung Jang, Sejong-si (KR); Bo Kyung Park, Seoul (KR); Robert Young Chul Kim, Yongin-shi (KR)

(73) Assignee: SEJONG INDUSTRY-ACADEMIA COOPERATION FOUNDATION HO, Jochiwon-Eup (KR)

(*) Notice: Subject to any disclaimer, the term of this patent is extended or adjusted under 35 U.S.C. 154(b) by 83 days.

(21) Appl. No.: 15/966,480

(22) Filed: Apr. 30, 2018

(65) Prior Publication Data
US 2019/0208039 A1    Jul. 4, 2019

(30) Foreign Application Priority Data

Jan. 3, 2018    (KR) .................. 10-2018-0000601

(51) Int. Cl.
*G06F 15/16*    (2006.01)
*H04L 29/06*    (2006.01)
(Continued)

(52) U.S. Cl.
CPC .............. *H04L 69/08* (2013.01); *G06F 16/86* (2019.01); *H04L 43/02* (2013.01); *H04L 43/04* (2013.01);
(Continued)

(58) Field of Classification Search
CPC ..... H04L 29/06; H04L 41/0803; H04L 63/06; H04L 67/02; H04L 69/04; H04L 69/22; H04W 84/18; H04W 88/16; H04Q 9/02
See application file for complete search history.

(56) References Cited

U.S. PATENT DOCUMENTS 10,129,227 B2 * 11/2018 Ahuja ..................... H04L 63/06
2011/0299455 A1 * 12/2011 Ordentlich .............. H04L 69/04
370/328

(Continued)

*Primary Examiner* — Dustin Nguyen
(74) *Attorney, Agent, or Firm* — Davis & Bujold PLLC; Michael J. Bujold

(57) ABSTRACT

Disclosed herein is a method for transforming data for low volume transmission of a meta model based protocol which monitors power amount data of new renewable energy, including: generating energy sensing data; receiving, by a client, the energy sensing data and transforming the received energy sensing data into meta model data including a meta model and meta data; generating packet meta model data by dividing and compressing the meta model data; transmitting the packet meta model data to a server through an Internet of Things (IOT) communication network; and parsing, by the server, the packet meta model data to output the meta model data.

18 Claims, 13 Drawing Sheets

(51) Int. Cl.
*H04L 12/26* (2006.01)
*G06F 16/84* (2019.01)
*H04L 29/08* (2006.01)
*G06F 16/23* (2019.01)

(52) U.S. Cl.
CPC .......... *H04L 43/08* (2013.01); *H04L 43/0894* (2013.01); *G06F 16/23* (2019.01); *H04L 67/12* (2013.01)

(56) References Cited

U.S. PATENT DOCUMENTS

| | | | |
|---|---|---|---|
| 2013/0089003 A1* | 4/2013 | Liang | H04W 84/18 370/255 |
| 2013/0094447 A1* | 4/2013 | Gidlund | H04W 88/16 370/328 |
| 2017/0006135 A1* | 1/2017 | Siebel | H04L 67/02 |
| 2018/0242058 A1* | 8/2018 | Hayakawa | H04Q 9/02 |
| 2018/0338017 A1* | 11/2018 | Mekuria | H04L 69/04 |
| 2019/0132196 A1* | 5/2019 | Trivedi | H04L 41/0803 |
| 2019/0238662 A1* | 8/2019 | Guibene | H04L 29/06 |
| 2019/0349426 A1* | 11/2019 | Smith | H04L 69/22 |

* cited by examiner

| KIND | TYPE | SIZE 1 | SIZE 2 | ··· | SIZE N | TYPE | SIZE | ··· | TYPE |
|---|---|---|---|---|---|---|---|---|---|
| TYPE | ALPHABET | NUMBER | NUMBER | ··· | NUMBER | ALPHABET | NUMBER | ··· | ALPHABET |
| SIZE | 1byte | 1byte | 1byte | ··· | 1byte | 1byte | 1byte | ··· | 1byte |

| Field | Data |
|---|---|
| id | 1 |
| key | a |
| className | Inverter |
| name | Inverter |
| property | num;current;day; |
| size | int:float:float: |
| parent | Inverters |
| child | warning |

FIG. 10

| id | key | className | name | property | size | parent | child |
|----|-----|-----------|------|----------|------|--------|-------|
| 1 | a | plantdisplay | plantdisplay | current; days; yesterday; month_power; last_month_power; total; | float; float; float; float; float; double; | hsSolarEnergy | |
| 2 | b | warning | warning | id; name; state; | String; String; String; | inverter | |
| 3 | c | inverter | inverter | num; current; day; yesterday; total; in_voltage; in_power; in_current; out_voltage; out_current; frequency; | int; float; float; float; double; float; float; float; float; float; float; | inverters | warning; |

FIG. 15

TRANSMITTED XML FILE

BODY PACKET LIST

FIG. 16

BODY PACKET LIST

COUPLED DATA PACKET

METHOD FOR TRANSFORMING DATA FOR LOW VOLUME TRANSMISSION OF META MODEL BASED PROTOCOL WHICH MONITORS POWER AMOUNT DATA OF NEW RENEWABLE ENERGY, AND SYSTEM FOR TRANSMITTING DATA FOR LOW VOLUME TRANSMISSION OF META MODEL BASED PROTOCOL WHICH MONITORS POWER AMOUNT DATA OF NEW RENEWABLE ENERGY

RELATED APPLICATIONS

This application claims priority to Korean Patent Application No. 10-2018-00000601, filed on Jan. 3, 2018, which is herein incorporated by reference in its entirety.

BACKGROUND

Field

The present invention relates to a method for transforming data for low volume transmission of a meta model based protocol which monitors power amount data of new renewable energy, and a system for transmitting data for low volume transmission of a meta model based protocol which monitors power amount data of new renewable energy.

Description of the Related Art

In order to monitor power amount data of new renewable energy, it is necessary to be able to confirm real time information on a power amount by communicating with inverters, junction boxes, and sensor devices, respectively, in a power plant. A client collecting information of the respective inverters transmits data to a server. In this case, since the respective inverters are not the same inverter, different communication methods should be used. In addition, the client collects data of each of the inverters and transmits it to an integration server. In order to integrate such heterogeneous data, the data is transmitted in a meta model.

The data of a number of inverters is transmitted and is transformed into the metal model so that it is transmitted from a local server to the integration server. Such meta model data is generated once every 10 seconds in each of the inverters, and when the inverter is connected to a web, the inverter receives the data every 10 seconds and provides real time information. However, monitoring using a TCP/IP dedicated line or an LTE wireless communication network incurs cost for information of 20,000~30,000 won per month.

Meanwhile, an IoT network incurs cost of 200~2200 won per month, which is relatively inexpensive. However, since a transmission rate of the IoT network is relatively slow, there is a problem in that many errors occur in transmitting the meta model data.

SUMMARY

An object of the present invention is to provide a method and a system for transforming data for low volume transmission of a meta model based protocol that may transmit and receive the data using an Internet of Thing (IoT) communication network having relatively small volume and transmission rate, without losing meta model data in which heterogeneous data is integrated.

According to an exemplary embodiment of the present invention, there is provided a method for transforming data for low volume transmission of a meta model based protocol which monitors power amount data of new renewable energy, including: generating energy sensing data; receiving, by a client, the energy sensing data and transforming the received energy sensing data into meta model data including a meta model and meta data; generating packet meta model data by dividing and compressing the meta model data; transmitting the packet meta model data to a server through an Internet of Things (IOT) communication network; and parsing, by the server, the packet meta model data to output the meta model data.

The IOT communication network may be a LoRa network.

The method may further include generating a key table through a key table creator and storing the key table in a database, wherein the generating of the packet meta model data by dividing the meta model data may include dividing, by a data packet creator, the meta model data using the key table to generate the packet meta model data.

The parsing, by the server, of the packet meta model data to output the meta model data may include parsing, by a data packet parser, the packet meta model data using the key table.

The method may further include obtaining transmission rate information of the IOT communication network, wherein the generating of the packet meta model data by dividing and compressing the meta model data may include: determining a reference size of the packet meta model data based on the transmission rate information; and dividing the meta model data based on the reference size.

The generating of the key table through the key table creator and storing the key table in the database may include generating the key table using attribute information of the meta model.

The key table may include an ID field, a key field, a classname field, a name field, a property field, a size field, a parent field, and a child field.

The generating of the packet meta model data by dividing and compressing the meta model data may include: generating compressed data by inputting meta data to the key table using an insert query and compressing the meta model data; and dividing the compressed data and generating a plurality of packet meta model data.

The generating of the key table using the attribute information of the meta model may include: loading Epackage information, which is the top model of the meta model; confirming eClassifiers having a subordinate relationship with the Epackage information; storing a key and then storing EClass name attribute information in the key when the eClassifiers are confirmed; confirming StructualFeature after storing the EClass name attribute information; confirming EAttribute when the StructualFeature is confirmed; storing name information and type attribute information the property and size fields when the EAttribute is confirmed, and determining EReference when the EAttribute is not confirmed and storing name attribute information of EReference in the child field; and inputting a record based on the stored data.

The generating of the key table using the attribute information of the meta model may further include storing previous classname data in the parent field.

The packet meta model data may include a header packet representing an entire data structure and a body packet representing the meta data.

The header packet may include data type information and data size information, and the data type information may be labeling information.

The header packet may further include variable size information.

The generating of the packet meta model data by dividing and compressing the meta model data may include: confirming a tag of the meta model data and adding key data to the header packet when there is no tag; confirming attribute information of the meta model data and confirming whether or not the attribute information is a primitive type when there is the attribute information; and adding a compressed data byte to the header packet and then adding a body of the meta data to the data packet, when the attribute information is the primitive type.

The generating of the packet meta model data by dividing and compressing the meta model data may include adding a data size to the header packet and adding the body of the meta data to the data packet, when the attribute information is not the primitive type.

The generating of the packet meta model data by dividing and compressing the meta model data may include confirming the tag of the meta model data, and disassembling the meta model data and adding a delimiter for classifying the disassembled data packets when there is the tag.

The disassembling of the meta model data and the adding of the delimiter for classifying the disassembled data packets when there is the key of the tag of the meta data may include disassembling the meta model data according to a size of the maximum data packet of the IOT network.

The IOT communication network may include a plurality of sub communication networks, and the transmitting of the packet meta model data to the server through the IOT communication network may include transmitting each of the plurality of divided packet model data to the server through the plurality of sub communication networks.

The parsing, by the server, of the packet meta model data to output the meta model data may include storing the packet model data with a file name including ID information and reception time information of the sub communication networks.

The parsing, by the server, of the packet meta model data to output the meta model data may include accumulating and storing the received packet model data.

The parsing, by the server, of the packet meta model data to output the meta model data may include: checking a con tag whenever the packet model data is stored; generating integrated packet data by integrating the accumulated packet model data into one packet when it is determined that the packet meta model data has final data contents of the meta model data according to the check result of the con tag; and restoring the integrated packet data to the meta model data using the key table.

The parsing, by the server, of the packet meta model data to output the meta model data may include: counting the number of times the packet model data is accumulated and stored; and comparing the number of times the packet model data is accumulated and stored with information on the number of the divided packets stored in the header packet of the packet model data, and generating the integrated packet data by integrating the accumulated and stored packet model data into one packet when being matched to each other.

The generating of the energy sensing data may include: generating original energy sensing data obtained from a power generation facility, the original energy sensing data including an original meta model and original meta model data; generating a database using the original meta model through a database generator; and generating the energy sensing data by inserting the original meta model data into the database through a database inserter.

According to another exemplary embodiment of the present invention, there is provided a system for transmitting data for low volume transmission of a meta model based protocol which monitors power amount data of new renewable energy, including: a database including a key table creator generating a key table and a database memory storing the key table; a client receiving energy sensing data from a new renewable energy production facility, transforming the energy sensing data into meta model data including a meta model and meta data, and generating packet meta model data by dividing and compressing the meta model data using the key table; and a server receiving the packet meta model data from the client through an Internet of Things (IOT) communication network, parsing the packet meta model data to be restored to the meta model data, and outputting the restored meta model data.

The IOT communication network may be a LoRa network.

The client may include a data packet creator receiving the key table from the database and generating the packet meta model data by dividing and compressing the meta model data using the key table.

The server may include a data packet parser receiving the key table from the database and restoring the packet meta model data by parsing the packet meta model data using the key table.

The database may include the key table creator generating the key table using the meta model data.

BRIEF DESCRIPTION OF THE DRAWINGS

FIG. 10 is a diagram illustrating a structure of the key table according to an exemplary embodiment of the present invention;

FIG. 15 is a diagram illustrating an extracted Con tag value having a value of a packet which is actually transmitted according to an exemplary embodiment of the present invention;

FIG. 16 is a diagram illustrating a process of integrating extracted con tag values into one data packet according to an exemplary embodiment of the present invention;

DETAILED DESCRIPTION

Hereinafter, a method for transforming data for low volume transmission of a meta model based protocol which monitors power amount data of new renewable energy, and a system for transmitting data for low volume transmission of a meta model based protocol which monitors power amount data of new renewable energy according to exemplary embodiments of the present invention will be described in more detail with reference to the accompanying drawings. A definition and a description of the terms used in the present specification are as follows.

Figures 1, 2:
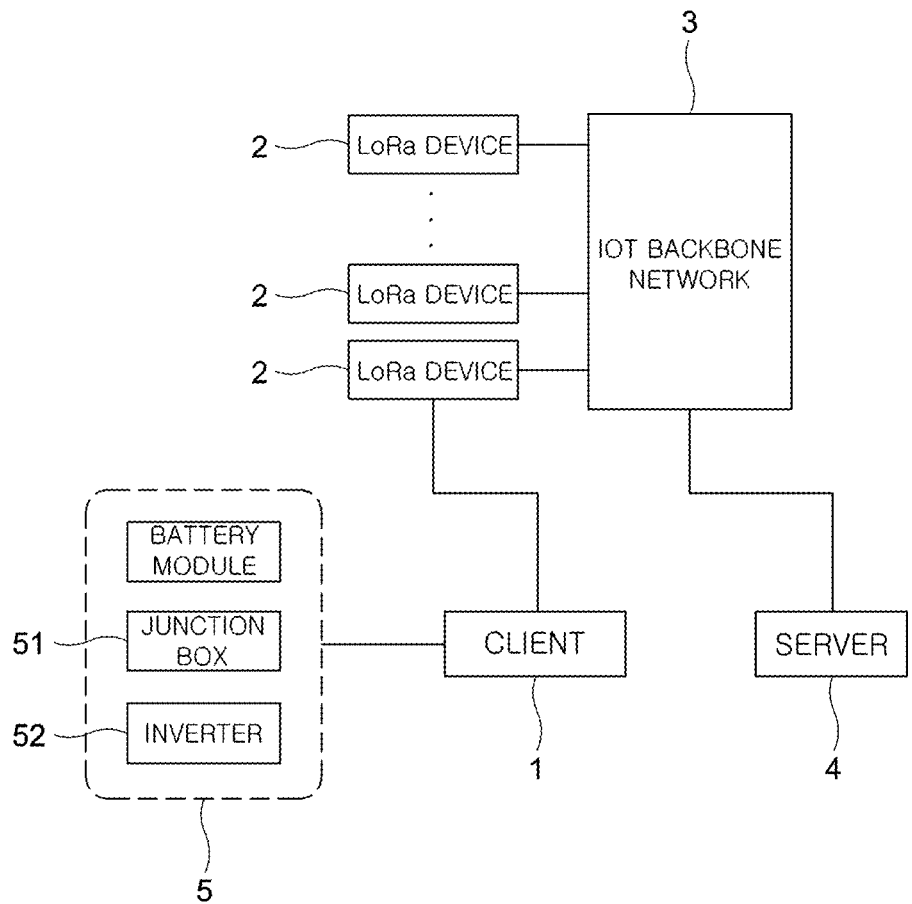
FIG. 1 is a block diagram illustrating a system for transmitting data for low volume transmission of a meta model based protocol.
FIG. 2 is a diagram illustrating a header packet generated by a method for transforming data for low volume transmission of a meta model based protocol according to an exemplary embodiment of the present invention.

FIG. 1 is a block diagram illustrating a system for transmitting data for low volume transmission of a meta model based protocol. As illustrated in FIG. 1, a system for transmitting data for low volume transmission of a meta model based protocol according to an exemplary embodiment of the present invention may generally include a client 1, a LoRa device 2, an IOT backbone network 3 (LoRa backbone network), and a server 4.

Various kinds of original sensing data may be generated from a new renewable energy power generation facility 5. Sensing data in a battery module 51, sensing data in a junction box 52, and sensing data in an inverter 53 may also be generated from the same energy power generation facility, for example, a sunlight power generation facility 5 as illustrated. Such original sensing data is transmitted to the client 1. The original sensing data include an original meta model and original metal model data, and various kinds of original energy sensing data is transformed into one integrated protocol format by generating a database using the original meta model through a database generator and inserting the original metal model data into the database through a database inserter to generate energy sensing data (the integrated form of meta model data) to be described below, and is then transmitted to the client. Accordingly, even though a heterogeneous new renewable energy power generation facility is added, the original energy sensing data may be simply transformed into the energy sensing data without modifying the entire system, thereby making it possible to improve economics.

As such, as one of the new renewable energy power generation facilities, the sunlight power generation facility 5 is illustrated in FIG. 1 of the present invention. As such, when the energy sensing data is generated from the power generation facility, the client 1 receives the energy sensing data. Examples of the energy sensing data may include various voltage and current related data in the junction box 52 or voltage and current related data in the inverter 53.

The client 1 receives the energy sensing data to transform it into the meta model data including the meta model data and the meta data as described above, and divides the meta model data into packet meta model data in consideration of a communication rate of an Internet of Things (IOT) communication network. In addition, the divided packet meta model data is transmitted in parallel to an IoT backbone network 3 (IOT communication network) through a plurality of LoRa devices 2 (IOT communication devices), a communication server receives the packet model data through the IOT backbone network 3, and the server 4 parses and integrates the packet meta model data to again restore initial metal model data.

Here, as the IOT communication network, the LoRa network may be used, which supports low volume communication. Theoretically, the LoRa network supports a minimum of 65 bytes and a maximum of 242 bytes depending on a radio reception rate. However, the energy sensing data obtained in an existing sunlight power generation is about 1 kbyte, and if it is divided as it is, it should be divided into at least fifteen sensing data. According to the configuration as described above, there is a problem in that it takes about 15*10 seconds (the time it takes to transmit once the data is 10 seconds)=150 seconds to transmit one sensing data.

Therefore, according to the present invention, the energy sensing data itself, which is primitive data, is reduced, thereby improving transmission efficiency. This will be described in detail below.

FIG. 2 is a diagram illustrating a header packet generated by a method for transforming data for low volume transmission of a meta model based protocol according to an exemplary embodiment of the present invention. In order to maximally reduce a data volume, information transmitted in a basic character string is transformed into a byte. In addition, the volume is reduced by using minimal bytes.

The data packet includes a header and a body packet, where the header stores structure information of the meta model data to be transmitted and the actual data value is divided and transmitted in the body. Therefore, the header is transmitted at one time, and the body is divided into n pieces according to a volume and is then transmitted.

The header packet stores information on the type and size of the data. That is, as illustrated in FIG. 2, the header packet has a continuous form. Here, we consider three cases.

1. A case in which there is information on one type and one size (the type and size are limited to 1 byte)=2 byte 2. A case in which there is information on one type and several (N) sizes=a total of 1+N byte 3. A case in which there is one type and no size=a total of 1 byte Therefore, the header is that the data type comes first, and there is no size, there is a size, or there are several sizes. When the number of sizes is variable as described above, variable data needs to be prefixed when interpreting the data. In order to reduce the above-mentioned information, the header is formed by utilizing information of the meta model, which is a schema of the data.

Figure 3:
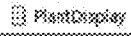
FIG. 3 is a diagram illustrating an example of energy sensed data in a power generation facility among energy sensing data associated with the present invention.

First, in order to limit a length of the data type to 1 byte, the data types appearing in the information of the meta model are labeled in the order of alphabet. For example, as illustrated in FIG. 3, in a case in which there is a meta model called Plantdisplay and there is data corresponding thereto, if the data model is transmitted according to the conventional method, 12 bytes needs to be used because PlantDisplay needs to be transmitted in a character string. Since both the sender and receiver have the information of the meta model, PlantDisplay may be represented as "a" if the labeling is applied to the data types. Since the data types are labeled in the order of alphabet, the representation of PlantDisplay as 'a' means that PlantDisplay is a first model in the meta model data. As attributes of PlantDisplay, a total of six attributes such as current, days, yesterday, month_power, last_month_power, and total are used. Conventionally, it is necessary to transmit all this information, but sine the data is ordered in the stored order in the meta model, name information of the attributes is not transmitted. In addition, in a case in which the size is not variable and is fixed like EFloat and EDouble defined in the meta model, the size information is also not transmitted. Therefore, in this example, when the header is transmitted, only 'a' is transmitted. The original data may be restored by referring the meta model only with alphabet information 'a'. To this end, it is necessary to make a connection relationship between the information of the meta model and the alphabet information in advance. A database table in which connection relationship data is stored is configured, which is referred to as a key table creator. This will be described in more detail below.

Figure 4:
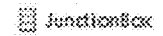
FIG. 4 is a diagram illustrating an example of energy sensed data in a junction box among energy sensed data associated with the present invention.

Meanwhile, the size information is transmitted only for an EString type, an EDate type, an Enum type, and the like. FIG. 4 illustrates meta model data of a junction box. As illustrated in FIG. 4, the junction box has an EString type. In this case, it is necessary to determine a size of data by confirming the data which is actually generated. In FIG. 4, when JunctionBox is labeled to 'b', the header called 'b 12 12' is created by confirming the size of the data. Since 'num', which is first data, has the data type of 'EInt' and the size which is fixed to 4 bytes, the size information is not described in the header, and since second and third data have the data type of 'EString' and the size which is variable, a size of actual data "0;0;0;0;0;0;" is calculated in a unit of byte and is input to the header.

A Primitive Type (EInt, EFloat, EDouble, etc.) having a fixed size in a process of transmitting data from the body causes a waste of data when transmitting a small number. For example, in a case in which EInt(4 byte) is defined, since EInt is fixed to 4 bytes, even a value of 0 is transmitted in 4 bytes with 0x00000000. Also in the case of 1, 4 bytes should be unconditionally used with 0x00000001. It is possible to represent in 1 byte, but 3 bytes are wasted. Therefore, information that may vary the size by the value of data is additionally added between the key value and the size value of the header (variable size information). The size to be input to the body is important because the data itself is binary data without a type. If the size information of the header has error, a wrong value may be read. Therefore, the header needs to store the size information of the data well.

In addition, as in the following Table 1, the variable size uses 2 bits as a variable data space. The use of such a space is determined by the number of attributes of the meta model. The above-mentioned PlantDisplay has the six attributes, and has a size which is determined as 6×2 bit=12 bit (12/8=2 byte (rounding off)). In addition, the junctionbox having one attribute is 1×2 bit=2/8=1 byte (rounding off).

TABLE 1

| 8 | 7 | 6 | 5 | 4 | 3 | 2 | 1 |
|---|---|---|---|---|---|---|---|
| 0 | 0 | 0 | 0 | 0 | 0 | 0 | 0 |

The range of data value is provided in Table 2 below. A final size is specified by reading a value from the body data to be transmitted. For example, 0 has a value of 00 in 2 bits of the key, and only 1 byte is read when being read in the body.

TABLE 2

| Range of Value | Size (byte) | Bit Representation of Key |
|---|---|---|
| −128~127 | 1 byte | 00 |
| −32, 768~32, 768 | 2 byte | 01 |
| −2, 147, 483, 638~2, 147, 483, 638 | 4 byte | 10 |
| Others | 8 byte | 11 |

Here, it is important to classify the type, the variable size, and the size from the header information without any classification and this may be performed by referring to a key table in which the meta model information is transformed into a table. The following is a schematic algorithm for processing this.

(1) Obtain the number P of attributes (EInt, EFloat, EDouble, and the like) of the primitive type and the number V of other attribute values (EString, EDate, Enum, and the like) from the key table by reading the type.

(2) Detect a value of the variable size by multiplying P with 2 bits.

(3) Read bytes of the variable size from the header.

(4) Read bytes of the value of V.

By performing the processing as described above, it is possible to classify and process the type, the variable size, and the size.

The body orders all the data to be transmitted according to the structure of the header. In addition, body divides the data into the size of the maximum packet that may be transmitted and transmits it. For example, when a total size of the data to be transmitted, that is, a size of compressed packet meta model data is 400 bytes and the size of the maximum packet is 65 bytes, the data is divided by 63 bytes (i.e., a size of a divided packet meta model data) obtained by subtracting 2 bytes which record the order of the data packets. Here, the size of the maximum packet is based on the transmission rate of the IOT communication network. That is, if the information of the transmission rate of the IOT is obtained, a reference size of the packet meta model data is divided depending on the transmission rate.

The data is divided as 400 byte/63 byte=6 and the remainder is 22 bytes, such that the data is divided into seven times in total and is then transmitted. Six body packets of 63 byte, which is the size of the maximum packet except for 2 byte recording the order, are transmitted, and the body packet of 22 byte is finally transmitted.

In order to confirm the order of packets disassembled according to the size of the maximum packet when the data is transmitted, the data is transmitted seven times in total by inputting the number of total data packets to be transmitted to a first 1 byte, inputting the order of current data packets to a second 1 byte, and inputting disassembled data to 63 byte except for two bytes.

Table 3 illustrates the header and the body packet which are used when being actually transmitted. An upper column of the header is a hexadecimal representation of byte, and a lower column there is its actual meaning. In the first position, an alphabet meaning the data type may be listed, and in the second position, the number may be listed or may not be listed, or several numbers may be listed. The meaning of this content may not be interpreted only by the header that is currently transmitted, and needs to refer to a reference table created by the key table creator. In addition, the body configures the data to be transmitted according to the data structure of the header and transmits it.

TABLE 3

| type | Binary Data |
|---|---|
| Header | 6c 07 1c 07 61 68 6b 6a 65 67 66 |
|  | 40 40 |
|  | 1 7 28 7 a h k j e g f |
|  | 64 64 |
| Body | 0x0601303031 . . . (omitted) . . . |
|  | 0x0602000000 . . . (omitted) . . . |
|  | 0x0603000000 . . . (omitted) . . . |
|  | 0x060401303b . . . (omitted) . . . |
|  | 0x0605303b30 . . . (omitted) . . . |
|  | 0x06063b303b |

A method for transforming data for low volume transmission of a meta model based protocol according to the present invention according to the present principle will be described with reference to FIG. 5.

Figure 5:
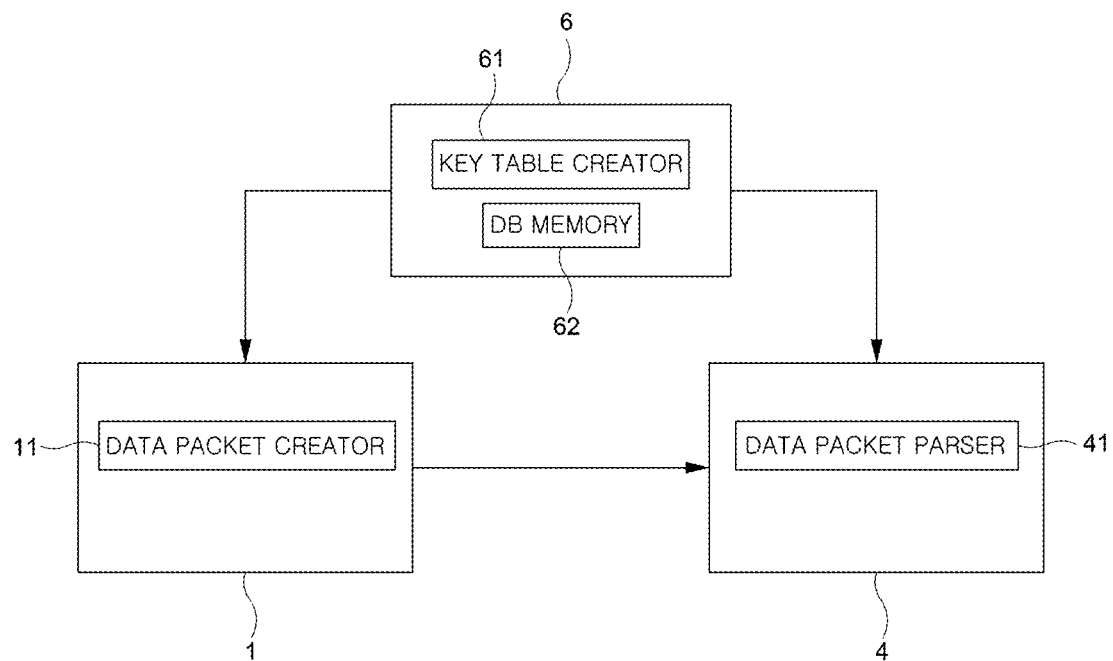
FIG. 5 is a diagram illustrating a structure for low volume transmission in the method for transforming data for low volume transmission of a meta model based protocol according to an exemplary embodiment of the present invention.

FIG. 5 is a diagram illustrating a structure for low volume transmission in the method for transforming data for low volume transmission of a meta model based protocol according to an exemplary embodiment of the present invention. As illustrated in FIG. 5, a system for transmitting data for low volume transmission of a meta model based protocol according to the present invention includes a database 6, a client 1, and a server 4.

The database 6 may include a key table creator 61 and a DB memory 62, which is a database storing a key table, as illustrated. The key table creator 61 of the database 6 generates the key table in which data labeled to the models configuring the meta model data and the size of each data. The data packet creator 11 included in the client 1 receives the key table generated in the database 6 and then receives data (meta model data of XMI form, i.e., sunlight bar) to be transmitted by referring to the key table to generate the packet having a reduced data size in a binary form, and generates packet meta data obtained by dividing the packet having the reduced data size based on the transmission rate of the IOT communication network, and the divided packet meta data is sequentially transmitted to the server through the LoRa network 3 including a plurality of LoRa devices 2. The server 4 receiving the divided packet meta data includes a data packet parser 41 and receives the key table generated by the key table creator 61 of the database 6, and the data packet parser 41 restores original XMI data to be transmitted by the client 1 by inversely performing the process of creasing the packet model data with reference to the key table.

Hereinafter, an operation of the key table creator, which is a component of the database, will be described in more detail with reference to FIGS. 6 to 10.

Figures 6, 7:
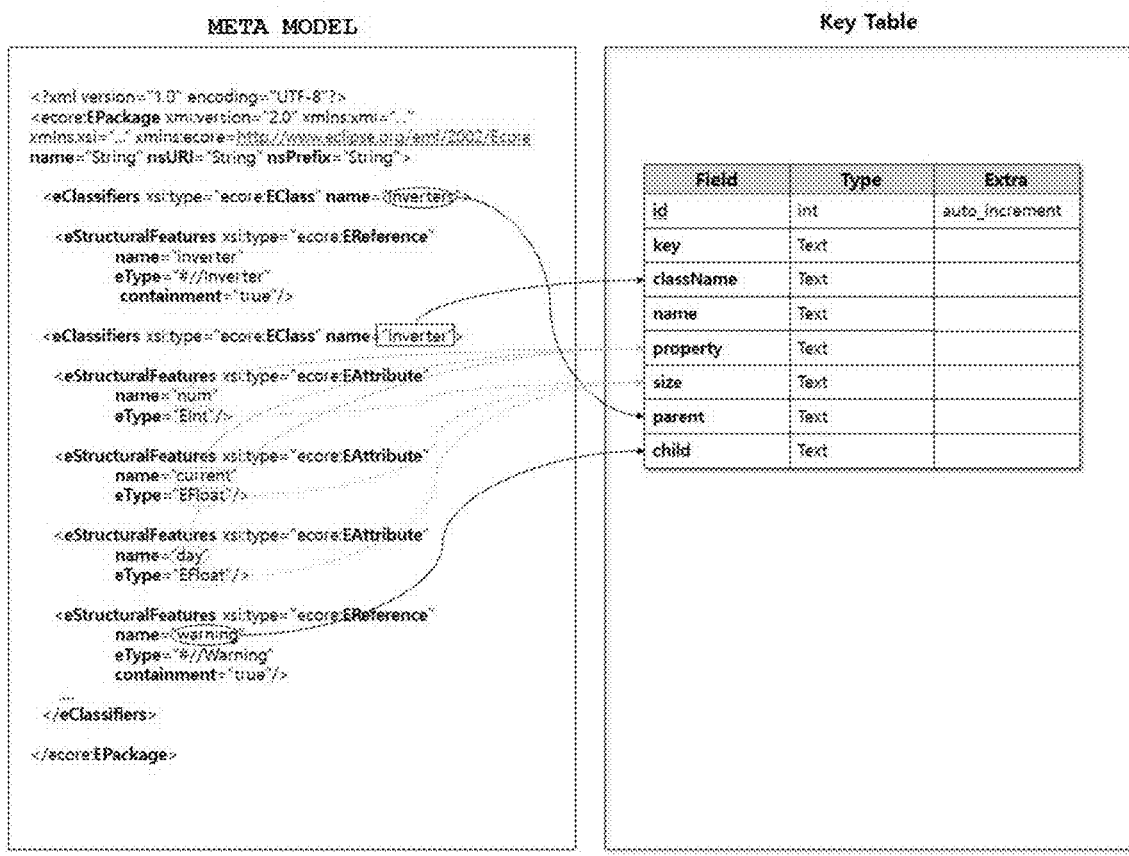
FIG. 6 is a diagram illustrating a relationship between a meta model and data of a key table according to an exemplary embodiment of the present invention.
FIG. 7 is a diagram illustrating an example of a recode generated in the key table according to an exemplary embodiment of the present invention.
Figure 8:
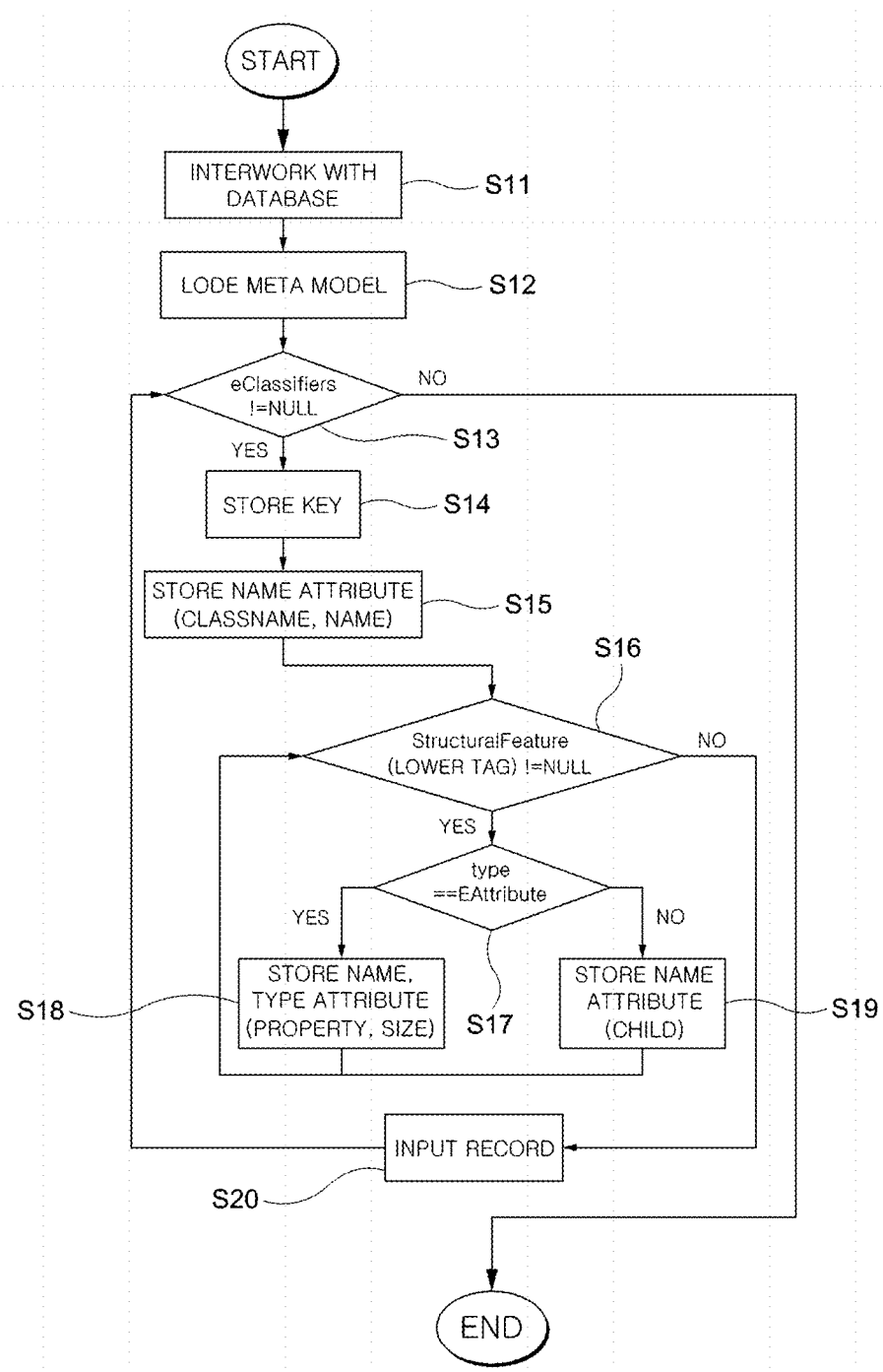
FIG. 8 is a flowchart illustrating an operation in a key table creator according to an exemplary embodiment of the present invention.
Figure 9:
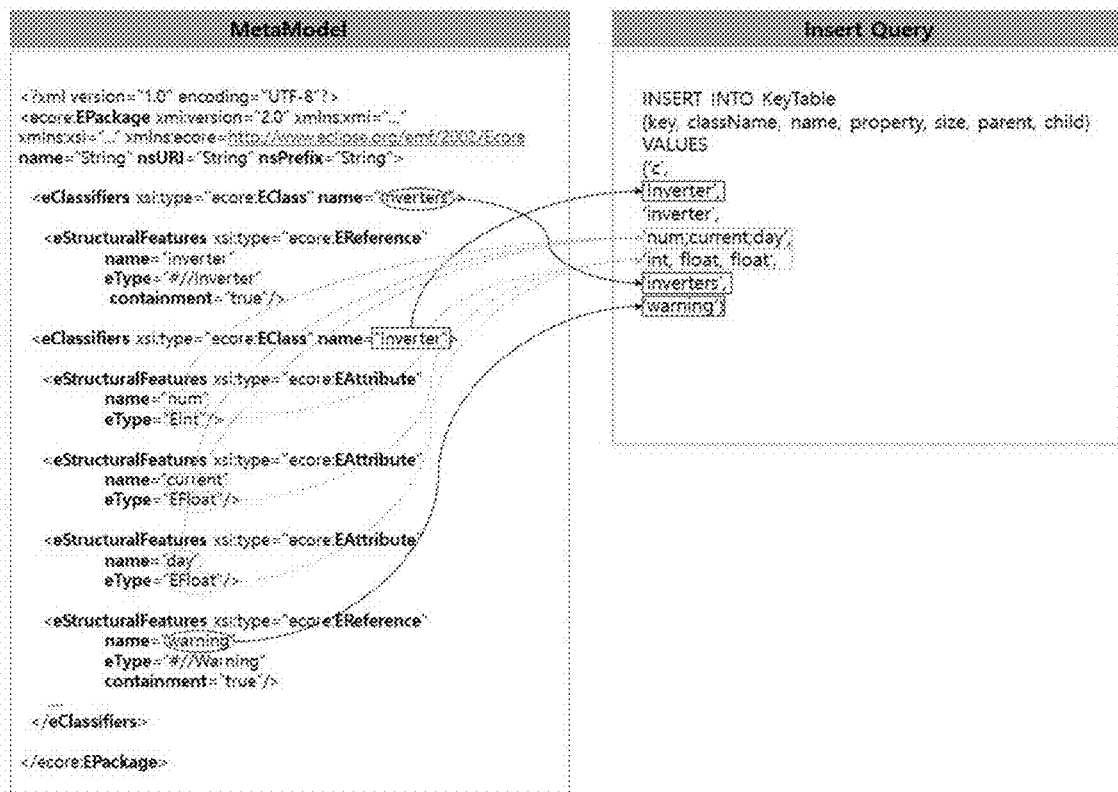
FIG. 9 is a diagram illustrating an automatic generation of a meta model based insert query according to an exemplary embodiment of the present invention.

FIG. 6 is a diagram illustrating a relationship between a meta model and data of a key table according to an exemplary embodiment of the present invention, FIG. 7 is a diagram illustrating an example of a recode generated in the key table according to an exemplary embodiment of the present invention, FIG. 8 is a flowchart illustrating an operation in a key table creator according to an exemplary embodiment of the present invention, FIG. 9 is a diagram illustrating an automatic generation of a meta model based insert query according to an exemplary embodiment of the present invention, and FIG. 10 is a diagram illustrating a structure of the key table according to an exemplary embodiment of the present invention. As illustrated in FIG. 6, the meta model includes information on a name (className, name) and labeling (key) of each data type and information on names (property) and sizes of the attributes included in the data. The key table creator 61 generates a table in which the information on a name (className, name) and labeling (key) of each data type and the information on names (property) and sizes of the attributes included in the data are stored from the meta model. In addition, in order to confirm the meta model structure, parent and child data representing a subordinate relationship is stored. The following represent a relationship between the meta model and the data of the key table.

Each KeyEClass in the meta model is stored as one record of the table. As illustrated in FIG. 6, a relationship EClass 'Inverter' and the data of the key table is illustrated by a line. Fields of the key table are classified into id, key, className, name, property, size, parent, and child. The id field is input with the number from 1 according to the input record order regardless of the meta model data and this field is set to a primary key. The key field is input with according to the record order regardless of actual data. This field is used as the labeling during transmission of the meta model data. The className field stores a name attribute of EClass in the meta model. The name field transforms all of the field values of className to a small letter and stores it because the name of EClass is used with the small letter in the meta model data. The property field stores a name attribute of EAttribute included in current EClass. Since a plurality of EAttributes are provided, each of the names is classified by 'semicolon (;)'. The size field stores a type attribute of each EAttribute. Similarly to the property field, each of the types is classified by ';'. The parent field is input with an upper class of the corresponding EClass, and the child field is input with a lower class of the corresponding EClass. In the current meta model, since EClass 'Inverters' includes EClass 'Inverter' as EReference in the lower class, the parent field of 'Inverter' is input with 'inverters', and since EClass 'Inverters' includes EClass 'warning' as EReference attribute in the lower class, the child field is input with 'warning'. If EClass called 'Inverter' is stored through such a process, a record as illustrated in FIG. 7 is generated.

An operation of the key table creator performing such a process is illustrated in FIG. 8. As illustrated in FIG. 8, the key table creator first interworks with the database storing the key table and loads the meta model (S11, S12). In addition, the key table creator generates the key table using attribute information of the meta model, loads Epackage information, which is the top model of the meta model, confirms eClassifiers having a subordinate relationship with the Epackage information, stores the key and then stores EClass name attribute information in the key when the eClassifiers are confirmed, confirms StructualFeature after storing the EClass name attribute information, confirms EAttribute when the StructualFeature is confirmed, stores name information and type attribute information the property and size fields when the EAttribute is confirmed, determines EReference when EAttribute is not confirmed, stores name attribute information of EReference in the child field, and inputs the record based on the stored data (S13 to S20).

In other words, the key table creator loads EPackage, which is the top model of the meta model, and loads EClassifiers having the subordinate relationship with EPackage. Since EClassifiers include several EClasses, the key table creator loads each of the EClasses through an iterator. A name attribute of the loaded EClass is stored. This value is stored in the className field in the table. Since EClass includes several EAttributes and EReferences, each of the EAttributes and EReferences is loaded and the type is classified through the iterator. In the case of EAttribute, the name and type attributes are stored. These values are stored in the property and size fields in the table. In the case of EReference, the name attribute is stored. This value is stored in the child field in the table. The record is input based on the stored data. Finally, current className data is transmitted to next EClass and is stored in the parent field. During this process, an insert query is automatically generated based on the meta model. The result is illustrated in FIG. 9. As described above, the insert query is automatically generated based on each data. The value of the key field is input according to the alphabet order regardless of the meta model data, and the name field is input with all of the data of the className field which are transformed into the small letter. A portion of the structure of the key table generated through the insert query which is automatically generated as described above is illustrated in FIG. 10. Here, "id" is used as the primary key for classifying each record, "key" is a tag name which is transformed into the corresponding alphabet when XMI is transformed into the data packet, "className" is a name of a class declared in an actual meta model, "name" is a name of a tag declared in an XMI file, "property" is a list of attribute names used in the corresponding tag, "size" is a material-type list representing a size of bytes of the corresponding attributes, "parent" is a parent tag of the corresponding tag, and "child" are child tags of the corresponding tag.

Hereinafter, operations of the data packet creator 11 included in the client 1 will be described with reference to FIGS. 11 to 14.

Figure 11:
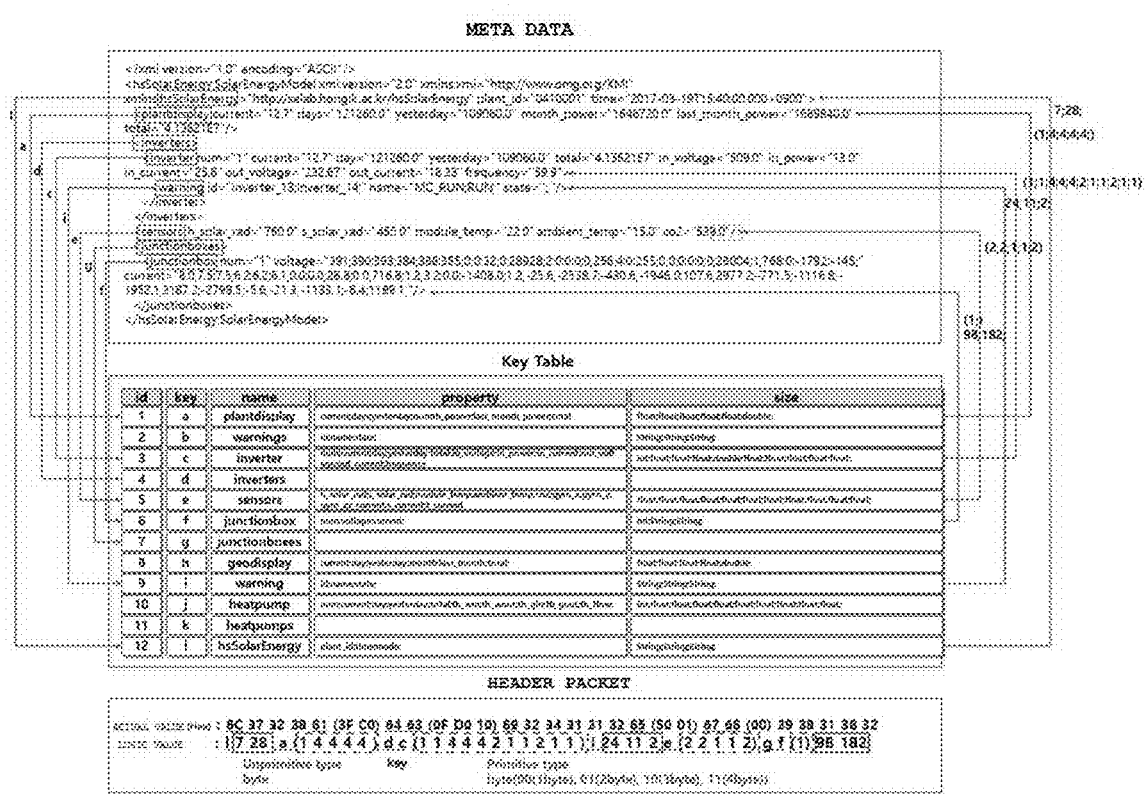
FIG. 11 is a diagram illustrating configurations of meta model data, a key table, and a header packet according to an exemplary embodiment of the present invention.
Figure 12:
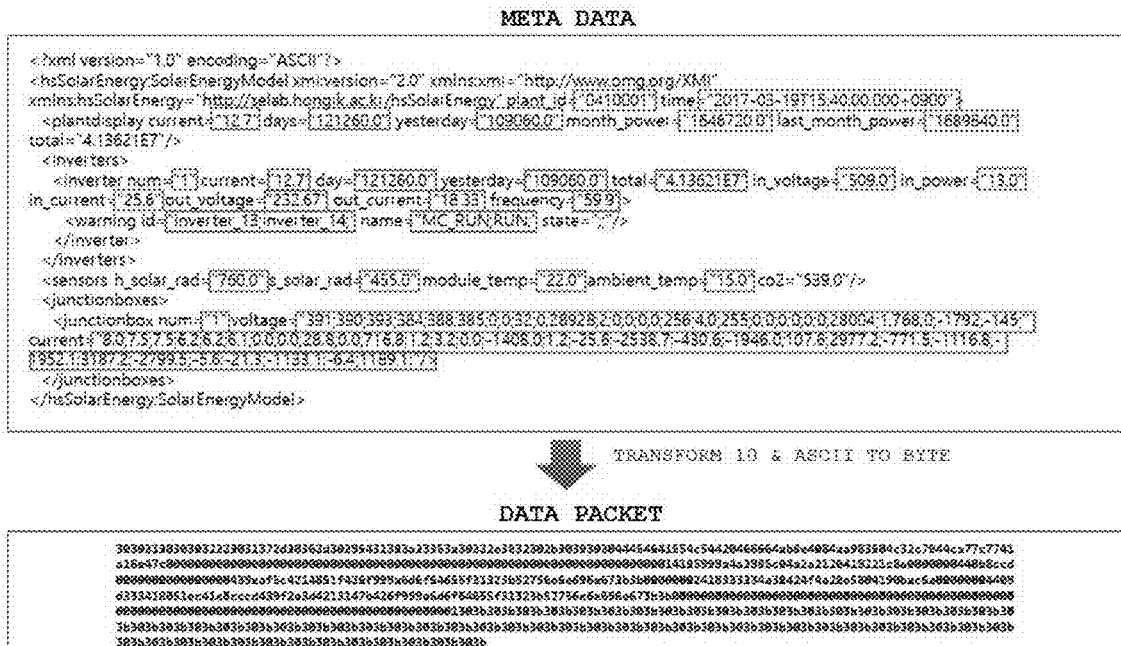
FIG. 12 is a diagram illustrating a process of configuring a data packet based on meta model data according to an exemplary embodiment of the present invention.
Figure 13:
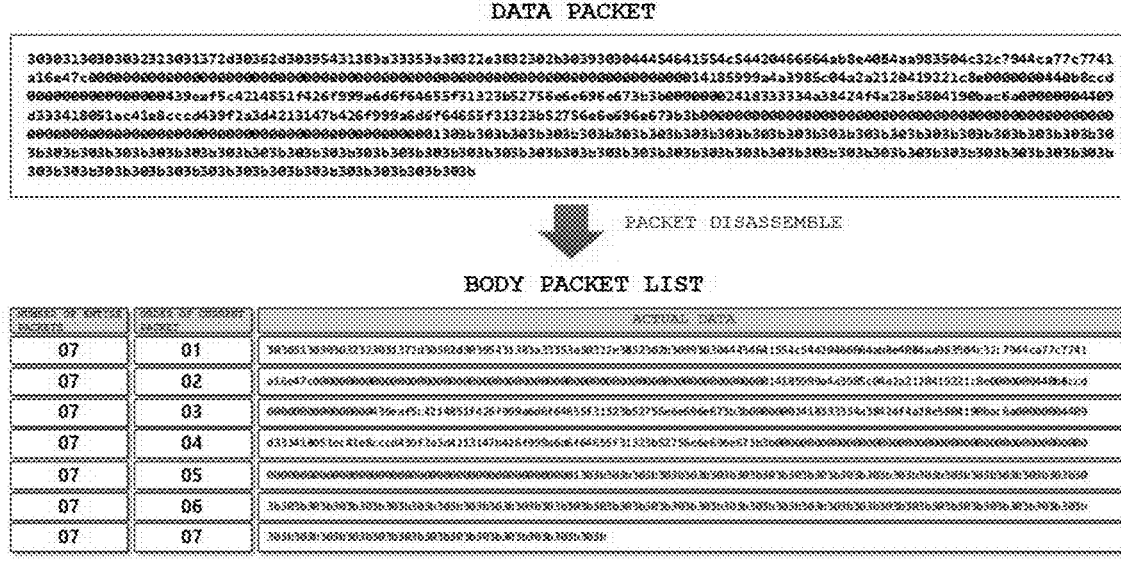
FIG. 13 is a diagram illustrating a disassembly result of a data packet according to an exemplary embodiment of the present invention.
Figure 14:
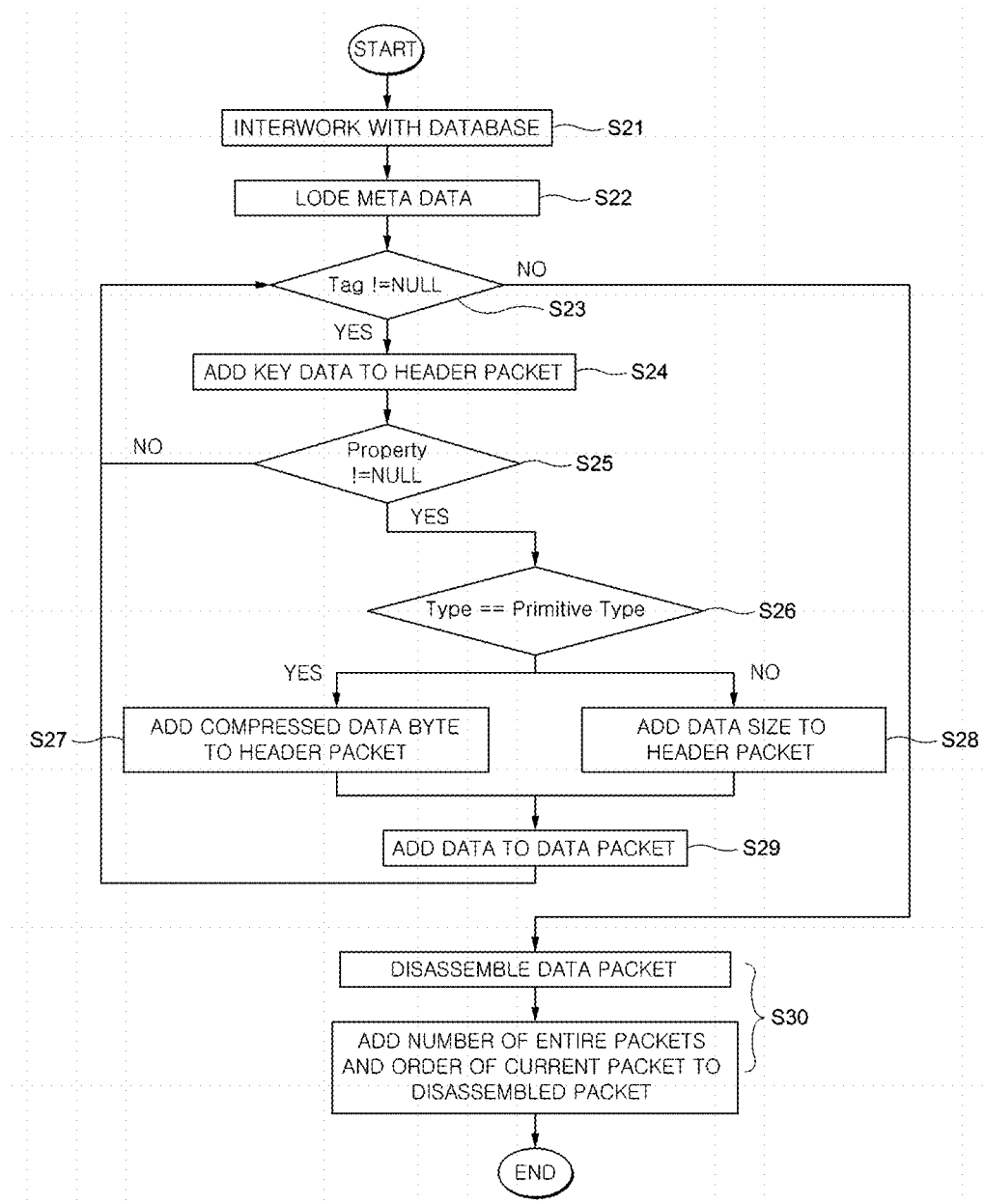
FIG. 14 is a flowchart illustrating an operation in a packet creator according to an exemplary embodiment of the present invention.

FIG. 11 is a diagram illustrating configurations of meta model data, a key table, and a header packet according to an exemplary embodiment of the present invention, FIG. 12 is a diagram illustrating a process of configuring a data packet based on meta model data according to an exemplary embodiment of the present invention, FIG. 13 is a diagram illustrating a disassembly result of a data packet according to an exemplary embodiment of the present invention, and FIG. 14 is a flowchart illustrating an operation in a packet creator according to an exemplary embodiment of the present invention.

A data packet creator 11, which is a component of the client 1, generates packet meta model data of a compressed and divided form from the meta model data obtained in the power generation facility with reference to the key table which is automatically generated by the key table creator 61 of the database 6. Since the divided packet meta model data has a form in which one data is disassembled into several data packets, it may include a header packet representing a structure of the entire data and a body packet representing actual data. In addition, 2 bytes are used as data representing the number (1 byte) of entire body packets and the order (1 byte) of the current body packet to classify the order of the body packets. FIG. 11 illustrates a relationship between actual meta model data, a key table, and a header packet.

FIG. 11 illustrates a process of configuring the header packet based on the meta model data. Each of the tags of the meta model data is loaded and the record with the same name attribute as a name of the tag in the key table is queried. A key value of the corresponding record is input to the header and all properties are confirmed. In the case of the primitive type, the size of the data is confirmed and data of 2 bits is added to the header packet depending on bytes. 1 byte is represented by 00, 2 bytes are represented by 01, 3 bytes are represented by 10, and 4 bytes are represented by 11. In the case of unprimitive type, a length of actual data is confirmed and is added to the header packet. A key field 'l' of 'hsSolarEnergy', which is a first tag, is added, and property for the corresponding record is confirmed. The corresponding record includes three properties 'plant_id', 'time', and 'mode'. Since the three attributes are all unprimitive types, the size of the actual data is confirmed in the meta model data. Data of 'plant_id' has a size of 7, and data of 'time' has a size of 28. Since 'mode' does not have data, it is not necessary to confirm the size thereof. 7 and 28 which are actual sizes of variable data are input. 'a', which is the key field of 'plantdisplay', which is a next tag, is added, and all properties are confirmed. Since all included properties are the primitive type, the size of the actual data is confirmed. Since the current attribute is a float type, it has a size of 4 bytes, but since a range of the actual data is small, the current attribute may be reduced to data of 1 byte. Therefore, a '00' bit meaning 1 byte is input to the header packet. The data packet transforms actual data of all attributes into a byte form in a process of configuring the header packet. FIG. 12 illustrates an example in which the byte data is represented in a hexadecimal to more simplify the byte data.

The entire data packets configured as described above need to be disassembled and transmitted according to a size of the maximum packet in the LoRa network. The maximum packet has 65 bytes in consideration of the transmission rate of the LoRa network, and the number of the entire packets and the order of the current packet are stored in 2 bytes in order to classify a list of the disassembled body packets. The actual data is stored in 63 bytes (body) except for 2 bytes (header). Therefore, the data packet is disassembled to include several body packets, as illustrated in FIG. 13. Also in FIG. 13, the byte form is simplified and is represented in the hexadecimal.

An operation of the data packet creator performing such a process will be described in more detail with reference to FIG. 14. Briefly, the packet creator interworks with the database and loads the meta data, confirms the tag of the meta model data, adds key data to the header packet when there is no tag, disassembles the meta model data, and adds delimiter for classifying the disassembled data packets (S21 to S24). The packet creator is operated to confirm attribute information of the meta model data, confirm whether or not the attribute information is a primitive type when there is the attribute information (S25 and S26), add a compressed data byte to the header packet when the attribute information is the primitive type (S27), and add the size of the data to the header packet when the attribute information is an unprimitive type (S28, S29). In more detail, the data packet creator, which is the component of the client, receives information of the database and interworks with the input information, thereby obtaining the key table. In addition, the data packet creator receives the meta model data. The data packet creator loads tags of the meta model data one by one, confirms a key of a current tag in the key table received from the database, and adds a value of the key to the header packet. The data packet creator loads all attributes included in the tag one by one to confirm a material type of a current attribute in the key table. The data packet creator adds bytes of the data that the actual data is compressed to the header in a case in which the material type is the primitive type, and adds the size of the actual data to the header packet in a case in which the material type is the unprimitive type. Thereafter, the data packet creator transforms the actual data into bytes and adds it to the data packet. The data packet creator configures the header packet and the data packet of all the tags, and disassembles the data packet according to the size of the maximum data packet of the LoRa network. The data packet creator inputs the number of all data packets to the first two bytes of the data packet and inputs the order of the current data packet to the next two bytes in order to classify the disassembled data packets, and then adds the actual data (S30).

Hereinafter, a configuration and an operation of the data packet parser, which is a component of the server, will be described in more detail with reference to FIGS. 15 to 18.

A data packet parser 41 receives the data transmitted by the data packet creator 11 through the LoRa network. The LoRa network transmits the received data to a specific webpage. One webpage per each LoRa module is differently assigned. For example, if it is set in the LoRa network so that data transmitted from a module A is transmitted to http://*.com/A1.php, the LoRa network transmits the transmitted data of the module A to http://*.com/A1.php. The transmitted data is XML file data, which is the meta model data. The XML file is accumulated and stored in the integration server on a time basis. A file name is stored in '[ModuleID_CurrentTime(unit of seconds)].xml'. Information such as a transmission date, LoRa module ID, and the like is stored in the XML file. The data transmitted by the LoRa module is stored in a con tag. That is, the packet meta model data is each transmitted to the server through the LoRa network including a plurality of sub communication networks, and this server accumulates and stores each packet meta model data in module ID and a reception time name.

The server checks the contents of the file whenever it stores the XML file, which is the divided packet meta model data. The checked contents are the contents of the con tag in the file. A location of the con in the file is illustrated in FIG. 15. The con tag is the contents of the packet which is actually transmitted.

If the stored XML file has the final packet contents, all XML files which are previously stored are read and actual data in the con tag is integrated into one packet, as illustrated in FIG. 16. That is, the accumulated and stored packet model data is integrated into one packet, thereby generating integrated packet data.

Figure 17:
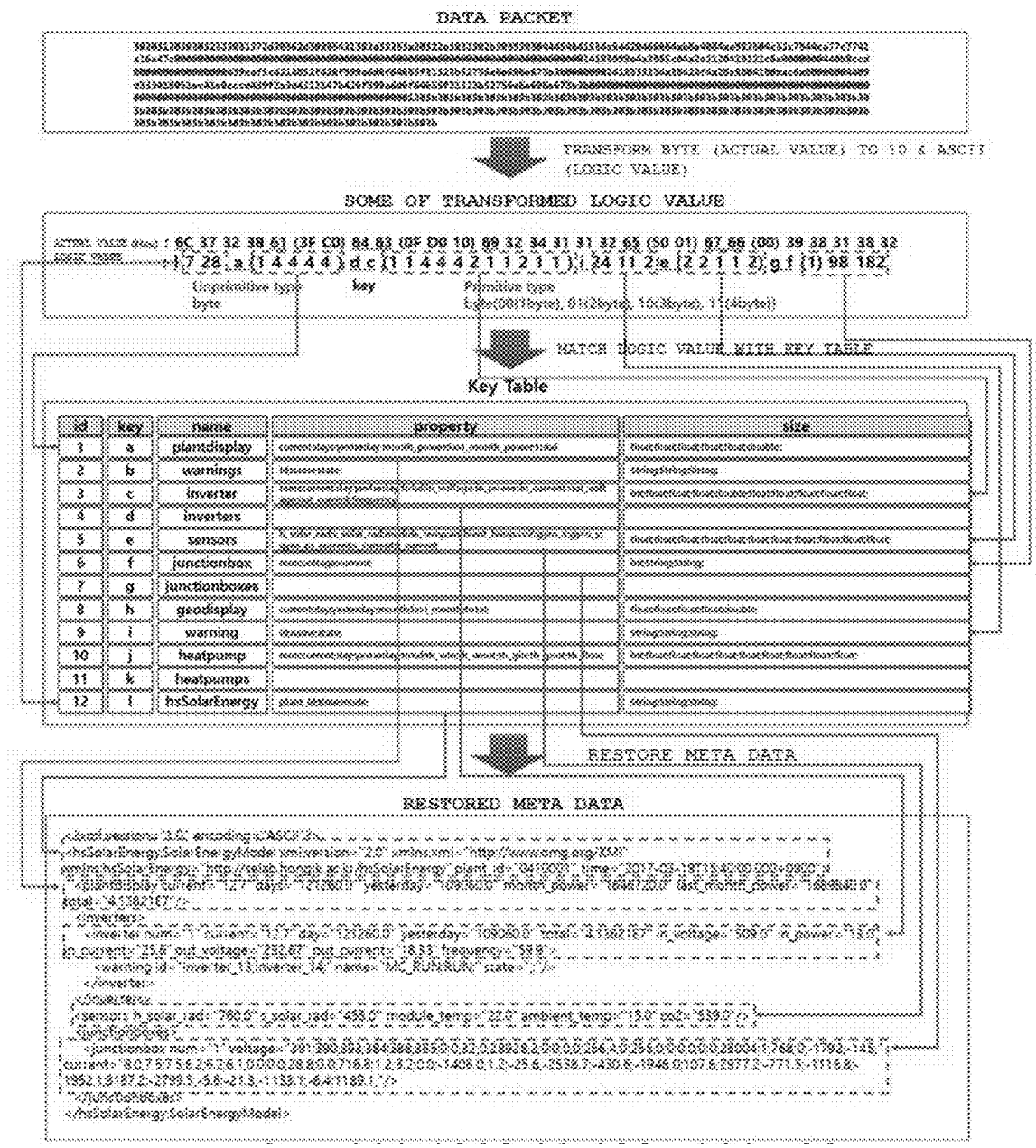
FIG. 17 is a diagram a process of restoring meta data from divided data packets according to an exemplary embodiment of the present invention.

A coupled data packet is restored to the meta data through a process as illustrated in FIG. 17. The restoring process has three steps. First, the data packet is transformed into a logic value. For example, if '6C', which is the hexadecimal, is transformed into ASCII, it becomes an alphabet 'l'. If '6C', which is the hexadecimal, is transformed into ASCII, it becomes an alphabet 'l'. If '37', which is the hexadecimal, is transformed into ASCII, it becomes a number '7'. In such a way, all data packets are transformed into the logic value.

Secondly, the transformed logic value is matched to the key table. For example, in a logic value including '1 7 28', 'l' means 'hsSolarEnergy', next '7' and '28' mean that a size of the plant_id attribute is 7 byte string, a size of the time attribute is a 28 byte string, and a size of the mode attribute is a 0 byte string. The matching method is a reverse order of the process of configuring the data packet based on the meta model data.

Thirdly, the data in which the matching is completed is restored. The restored data has an XML form. A tag name and attribute information of a tag are restored in a first packet. Values of the attributes are restored in second to final packets.

Hereinafter, an operation of the data packet parser, which is the component of the server, will be described in detail with reference to FIG. 18.

Figure 18:
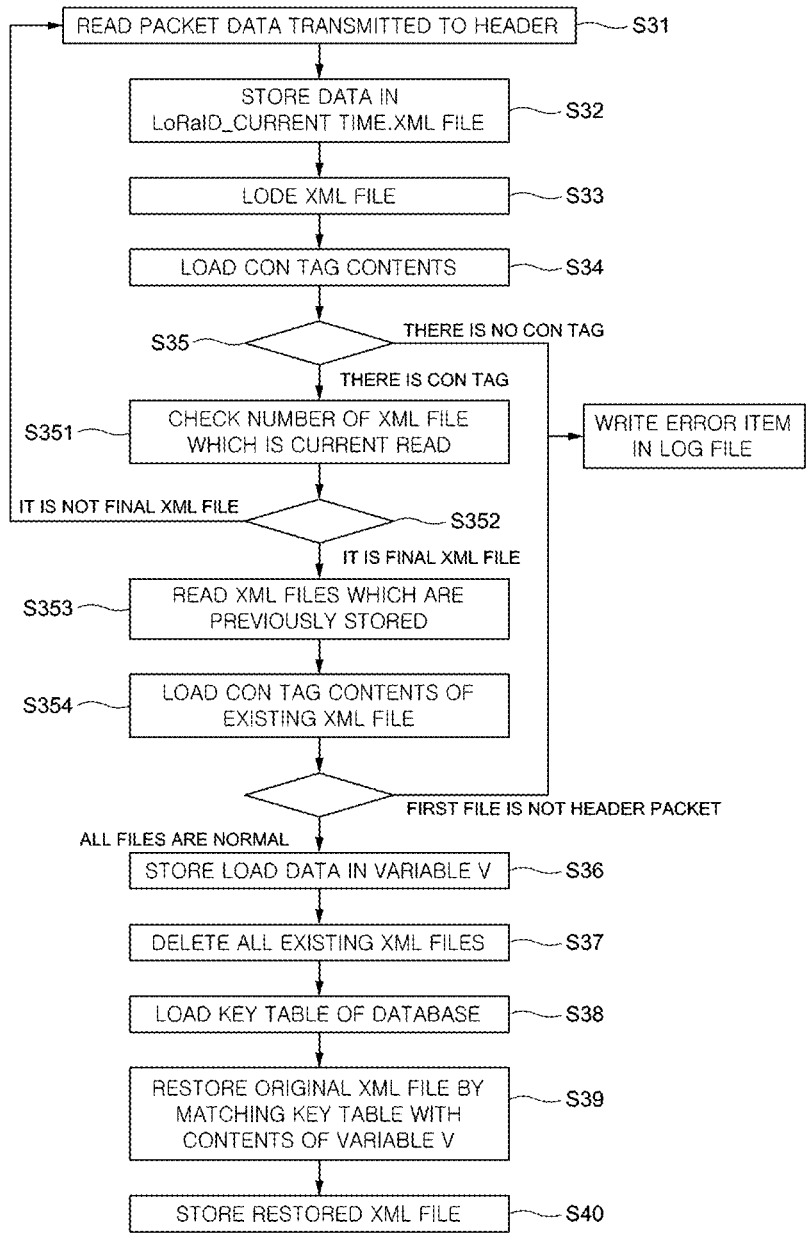
FIG. 18 is a flowchart illustrating an operation in a packet parser according to an exemplary embodiment of the present invention.

As illustrated in FIG. 18, the data packet parser first performs the data processing operation of the webpage described above. That is, the data packet parser reads the data stored in the header of the divided packet model data received through the IOT network, stores the data in LoRa ID and the reception time name, loads the packet model data to continuously store the XML file transmitted through the LoRa network, and reads the con tag of the XML file. The data packet parser continues to read the data stored in the con tag, and if there is no con tag, it confirms that a first file is not the header packet, and if all files are normal, it stores the loaded field in a variable v (S31 to S36).

If there is the con tag, the data packet parser checks the number of the file of the currently read file, and if the currently read file is the final file of the XML, it reads the files which are previously stored at one time and sums them to thereby store it in one variable v (S351 to S354). Next, existing XML files are deleted (S37).

Meanwhile, if the generation of the data stored in the variable v is completed, the data stored in the variable v is matched to the key table of the database, is restored to an original XMI file, and is stored in the restored XMI file (S38 to S40). That is, after the key table is loaded from the database, the data is matched to the key table and is restored to the original XMI file. The restoring process is performed in a reverse order of the process of creating the actual packet. A process of transforming an ASCII code into a decimal is required in the restoring process. The con tag represents all data in the hexadecimal and represents it in the ASCII code. If the LoRa module inserts 10 into a data space of 1 byte and transmits it, the con tag is read as a value of '0' 'A'. Therefore, a process of first transforming the ASCII code into the data of the hexadecimal and transforming the data of the hexadecimal into the decimal is required. That is, two letter strings per 1 byte need to be read and interpreted. If the LoRa module inserts 'S' (=0x53) into the data space of 1 byte and transmits it, the con tag is read as a letter string of '5' '3'.

According to an exemplary embodiment of the present invention having the configuration described above, it is possible to sufficiently transmit a large volume of meta model data in real time even through the IoT communication network having the relatively small volume and transmission rate.

According to the method for transforming data for low volume transmission of a meta model based protocol which monitors power amount data of new renewable energy and the system for transmitting data for low volume transmission of a meta model based protocol which monitors power amount data of new renewable energy as described above, the configurations and the methods of the exemplary embodiments described above may not be applied as being limited, but all or some of the exemplary embodiments may be selectively combined so that the exemplary embodiments may be variously modified.

What is claimed is:

1. A method for transforming data for low volume transmission of a meta model based protocol which monitors power amount data of new renewable energy, the method comprising:
   generating energy sensing data;
   receiving, by a client, the energy sensing data and transforming the received energy sensing data into meta model data including a meta model and meta data;
   generating packet meta model data by dividing and compressing the meta model data;
   transmitting the packet meta model data to a server through an Internet of Things (IOT) communication network;
   parsing, by the server, the packet meta model data to output the meta model data;
   generating a key table through a key table creator and storing the key table in a database,
   wherein the generating of the packet meta model data by dividing the meta model data includes dividing, by a data packet creator, the meta model data using the key table to generate the packet meta model data; and
   the generating of the packet meta model data by dividing and compressing the meta model data includes:
   confirming a tag of the meta model data and adding key data to the header packet when there is no tag;
   confirming attribute information of the meta model data and confirming whether or not the attribute information is a primitive type when there is the attribute information; and
   adding a compressed data byte to the header packet and then adding a body of the meta data to the data packet, when the attribute information is the primitive type.

2. The method of claim 1, wherein the IOT communication network is a LoRa network.

3. The method of claim 1, wherein the parsing, by the server, of the packet meta model data to output the meta model data includes parsing, by a data packet parser, the packet meta model data using the key table.

4. The method of claim 1, further comprising obtaining transmission rate information of the IOT communication network,
   wherein the generating of the packet meta model data by dividing and compressing the meta model data includes:
   determining a reference size of the packet meta model data based on the transmission rate information; and
   dividing the meta model data based on the reference size.

5. The method of claim 1, wherein the generating of the key table through the key table creator and storing the key table in the database includes generating the key table using attribute information of the meta model.

6. The method of claim 5, wherein the key table includes an ID field, a key field, a classname field, a name field, a property field, a size field, a parent field, and a child field.

7. The method of claim 5, wherein the generating of the packet meta model data by dividing and compressing the meta model data includes:
   generating compressed data by inputting meta data to the key table using an insert query and compressing the meta model data; and
   dividing the compressed data and generating a plurality of packet meta model data.

8. The method of claim 6, wherein the generating of the key table using the attribute information of the meta model includes:
   loading Epackage information, which is the top model of the meta model;
   confirming eClassifiers having a subordinate relationship with the Epackage information;
   storing a key and then storing EClass name attribute information in the key when the eClassifiers are confirmed;
   confirming StructualFeature after storing the EClass name attribute information;
   confirming EAttribute when the StructualFeature is confirmed;
   storing name information and type attribute information the property and size fields when the EAttribute is confirmed, and determining EReference when the EAttribute is not confirmed and storing name attribute information of EReference in the child field; and
   inputting a record based on the stored data.

9. The method of claim 8, wherein the generating of the key table using the attribute information of the meta model further includes storing previous classname data in the parent field.

10. The method of claim 1, wherein the packet meta model data includes a header packet representing an entire data structure and a body packet representing the meta data,
    the header packet includes data type information, data size information, and variable size information, and
    the data type information is labeling information.

11. The method of claim 1, wherein the generating of the packet meta model data by dividing and compressing the meta model data includes adding a data size to the header packet and adding the body of the meta data to the data packet, when the attribute information is not the primitive type.

12. The method of claim 11, wherein the generating of the packet meta model data by dividing and compressing the meta model data includes confirming the tag of the meta model data, and disassembling the meta model data and adding a delimiter for classifying the disassembled data packets when there is a key of the tag of the meta data,
    the disassembling of the meta model data and the adding of the delimiter for classifying the disassembled data packets when there is the tag includes disassembling the meta model data according to a size of the maximum data packet of the IOT network.

13. A method for transforming data for low volume transmission of a meta model based protocol which monitors power amount data of new renewable energy, the method comprising:
    generating enemy sensing data;
    receiving, by a client, the energy sensing data and transforming the received energy sensing data into meta model data including a met model and meta data;
    generating packet meta model data by dividing and compressing the meta model data;
    transmitting the packet meta model data to a server through an Internet of Things (IOT) communication network;
    parsing, by the server, the packet meta model data to output the meta model data; and
    the IOT communication network includes a plurality of sub communication networks, and
    the transmitting of the packet meta model data to the server through the IOT communication network includes transmitting each of the plurality of divided packet model data to the server through the plurality of sub communication networks, the parsing, by the server, of the packet meta model data to output the meta model data includes storing the packet model data with a file name including ID information and reception time information of the sub communication networks, the parsing, by the server, of the packet meta model data to output the meta model data includes accumulating and storing the received packet model data, and the parsing, by the server, of the packet meta model data to output the meta model data includes:

checking a con tag whenever the packet model data is stored;

generating integrated packet data by integrating the accumulated packet model data into one packet when it is determined that the packet meta model data has final data contents of the meta model data according to the check result of the con tag; and restoring the integrated packet data to the meta model data using the key table.

14. The method of claim 13, wherein the parsing, by the server, of the packet meta model data to output the meta model data includes:

counting the number of times the packet model data is accumulated and stored; and comparing the number of times the packet model data is accumulated and stored with information on the number of the divided packets stored in the header packet of the packet model data, and generating the integrated packet data by integrating the accumulated and stored packet model data into one packet when being matched to each other.

15. The method of claim 1, wherein the generating of the energy sensing data includes:

generating original energy sensing data obtained from a power generation facility, the original energy sensing data including an original meta model and original meta model data;

generating a database using the original meta model through a database generator; and generating the energy sensing data by inserting the original meta model data into the database through a database inserter.

16. A system for transmitting data for low volume transmission of a meta model based protocol which monitors power amount data of new renewable energy, the system comprising:

a database including a key table creator generating a key table and a database memory storing the key table;

a client having a data packet creator receiving energy sensing data generated by a new renewable energy production facility, transforming the energy sensing data into meta model data including a meta model and meta data, and generating packet meta model data by dividing and compressing the meta model data using the key table and including: confirming a tag of the meta model data and adding key data to a header packet when there is no tag: confirming attribute information of the meta model data and confirming whether or not the attribute information is a primitive type when there is the attribute information; and adding a compressed data byte to the header packet and then adding a body of the meta data to a data packet, when the attribute information is the primitive ve and the client transmitting the packet meta model data through an Internet of Things (IOT) communication network; and a server receiving the packet meta model data transmitted from the client through the Internet of Things (IOT) communication network, parsing the packet meta model data to be restored to the meta model data, and outputting the restored meta model data.

17. The system of claim 16, wherein the client includes the data packet creator receiving the key table from the database and generating the packet meta model data by dividing and compressing the meta model data using the key table.

18. The system of claim 16, wherein the server includes a data packet parser receiving the key table from the database and restoring the packet meta model data by parsing the packet meta model data using the key table, and the database includes the key table creator generating the key table using the meta model data.

* * * * *